US005230064A

United States Patent [19]

Kuo et al.

[11] Patent Number: 5,230,064

[45] Date of Patent: Jul. 20, 1993

[54] HIGH RESOLUTION GRAPHIC DISPLAY ORGANIZATION

[75] Inventors: Bor-chuan Kuo, Hsinchu; Wen-jann Yang, Tainan, both of Taiwan

[73] Assignee: Industrial Technology Research Institute, Hsinchu, Taiwan

[21] Appl. No.: 667,263

[22] Filed: Mar. 11, 1991

[51] Int. Cl.[5] .............................................. G06F 15/20

[52] U.S. Cl. ................................ 395/162; 364/231.8; 340/747

[58] Field of Search ........ 364/521, 518, 522, 231.8 A, 364/927.4 P, 931.4 S; 340/747, 750, 799, 725, 724, 723; 358/185, 311; 382/22; 395/162, 164, 165, 166

[56] References Cited

U.S. PATENT DOCUMENTS

| | | | |
|---|---|---|---|
| 4,985,848 | 1/1991 | Pfeiffer et al. | 364/518 |
| 4,991,110 | 2/1991 | Hannah | 364/518 |
| 5,007,005 | 11/1991 | Hatakeyama et al. | 364/521 |

*Primary Examiner*—Gary V. Harkcom
*Assistant Examiner*—Phu K. Nguyen
*Attorney, Agent, or Firm*—H. C. Lin

[57] ABSTRACT

A pixel arrangement scheme for a high resolution graphics display system, using video RAMs. Pixels are time multiplexed instead of using a temporary memory in a conventional system. Memory arrangement to implement this scheme is made to obtain higher speed and lower cost, consistent with the increased capacity of VRAMs.

4 Claims, 13 Drawing Sheets

HIGH RESOLUTION GRAPHIC DISPLAY ORGANIZATION

BACKGROUND OF THE INVENTION

The present invention relates to computer graphics apparatus, using video RAMs and conventional parallel accessed frame buffers.

In a conventional graphics display system, the display file which holds the view of a picture is placed in a refresh memory or frame buffer. A display processor reads the contents of the frame buffer and sends instructions to vectors generators which convert geometric descriptions into XY analog voltages to control the deflection of the electron beam of a cathod ray tube.

The architecture of generalized computer graphics display system is shown in FIG. 1. The geometric pipeline subsystem 1 receives output primitive from the host and generates command for the pixel rendering module 2. The picture rendering module 2 receives the commend and calculates pixel data to write into memory module 3. The memory module 3 stores the pixel data ready to be displayed and is controlled by the display control module 4 to serially shift out the pixel data. Then the pixel data is converted to analog signal on the screen.

The memory arrangement in the memory module 3 is the key component in the display subsystem. It influences the performance of the system, and determines whether the display system can be implemented by hardware. The memory module also influences the implementation in the pixel rendering module 2 and display control module 4.

Due to the reduction in the cost of random access memory (RAM), the random access raster scan display is currently the most popular computer graphics apparatus. According to the goal of the European Ergonomic standards, which define and measure certain factors on the CRT display/human interface, the screen refresh rate should not go below 60 Hz and should preferably have a rate of 70 Hz. The video rate (pixel frequency) for a given CRT can be calculated by the equation:

$$\text{Video rate} = \frac{\text{Horizontal number of visible pixels}}{\dfrac{\dfrac{1}{\text{refresh rate}} - \text{vertical retrace period}}{\text{visible lines per frame}} - \text{horizontal retrace period}}$$

The horizontal retrace period is approximately 10% of the horizontal scan period, the vertical retrace period is approximately 10% of the vertical scan period.

Based on the above formula, one can obtain the following table.

TABLE 1

| Display resolution # of pixels | Video frequency | Pixel time |
|---|---|---|
| 1024*1024 | ~90 MHz | 11 ns |
| 1280*1024 | ~110 MHz | 9 ns |
| 1600*1280 | ~170 MHz | 5 ns |
| 2048*2048 | ~350 MHz | 3 ns |

If the display resolution is high, it requires relatively long time to access the frame buffer for refreshing the screen image. However, if the access time becomes large in relation to the time which the graphics processor of the host processor access the frame buffer to modify the display image, then the response time of the graphics display from instruction to modification becomes very long. The best approach is to use a video RAM (VRAM). VRAM has two ports: the random port and the serial port. The random port has the same function as a standard DRAM. The serial port has the same function as a shift register. In video applications, the serial port acts as a second memory port and is used for screen refresh. In the horizontal blanking period, one line in the random port is transferred to the serial port, and in the display period, data contained in the serial port is shifted out as the pixel signals. Once the video data is loaded in parallel from the random port to the serial port, no further access is required to the random port for screen refresh. One can see the full bandwidth for graphics process or host processor to access the random port in all display period.

The 64K*4 VRAm has been developed by many IC companies with serial clock cycle time up to 40 ns. The 256K*4 has also been developed by many IC companies with serial clock cycle time up to 30 ns. The capacity has increased four times but the serial clock cycle time has reduced by only 10 ns. This effect is the impetus for invention of a new arrangement scheme for the graphics display system.

Due to the advancement of the semiconductor technology, the capacity of the VRAM increases from 64K*4 to 256K*4. In the past, to design a frame buffer containing 2K*2K pixels with 8 bit planes in a single pixel requires 128 pieces of 64K*4 VRAMs. Nowadays, it only needs 32 pieces of 256K*4 VRAMs, and decreases the number of IC chips by 100. This decrease makes it convenient to manufacture and maintain, and increases the reliability of the product.

The design using 256K*4 VRAMs, however, causes some new problems for the designer. Firstly, although the capacity increases by four times from 64K*4 to 256K*4, the serial clcok cycle time only decreases from 40 ns to 30 ns. This decrease does not match the ratio of the increases storage. Secondly, because of the reduction of the VRAM chip number, the partitionable bank number is decreased. Take 2K*2K addressable pixel frame buffer with eight bit planes per pixel as an example. It can be arranged to have 64 banks using 64K*4 VRAMS, but only 16 banks can be arranged using 256K*4 VRAMs. These two problems must be taken into consideration in the memory arrangement of a parallel accessed frame buffer.

According to the user's requirement in graphics efficiency, some graphics architecture with parallel processing has been proposed. It is obvious from these architecture that if a 4*4 or 8*8 pixel area is arranged as the unit region of the parallel processing, the system can achieve better graphics performance.

To date, the capacity of the frame buffer with the ability of parallel processing is mostly less than 1280*1024 pixels, and mostly using 64K*4 VRAMs.

Take a conventional 1280*1024 parallel accessed frame buffer as an example. When the 64K*4 VRAM is used, the minimum serial clock cyle is up to 40 ns and the pixel output rate is 110 MHz (9 ns/pixel) as indicated in Table 1.

FIG. 2-1 illustrtes a conventional memory arrangement for a 1280*1024 pixel display using an interleaved frame buffer. One may divide the 64K*4 VRAM into 20 banks. Each bank contains one fifth of pixels in one scan line, and contains one fourth of scan lines in a frame. Take bank 0 as an example, the row number 0 contains screen X=0, 5, 10, . . . , 1275 in Y=0, and column number 0 contains screen Y=0,4,8, . . . , 1016, 1020 in X=0. The horizontal direction contains 256 locations. Combining the locations from bank 0 to bank 4, there are 1280 locations, equal to one screen scan line. The vertical direction of the VRAM also contains 256 locations, and combines the banks in the vertical direction. There are 1024 locations, equal to the screen scan line numbers in one frame.

FIG. 2—2 illustrates the relationship between the pixels on screen and the pixels in the memory bank. One can randomly select 5*5 block area on screen and the corresponding area in the frame buffer can be accessed in parallel as indicated by the bank number of the frame buffer in each pixel location.

FIG. 2-3 illustrates the raster output sequence. For power saving consideration, one screen scan line is transferred at one time in a horizontal blanking period. That is to say, data from bank 0 to bank 4 for one horizontal line is transferred to the serial port, and then shifted out in the display period to display on the screen. Next, data from bank 5 to bank 9 for one horizontal line is transferred to the serial port, and so on.

For better picture quality, more addressable pixels are required and may be achieved with 1600*1280 resolution or 2048*2048 resolution. For reducing chip count, reducing board size, and increasing reliability, 256K*4 VRAMs may be used. However, if the high resolution is to be implemented, high clock rate is required. If the 256K*4 VRAMs are used, the partitionable memory banks are reduced, while the cycle is only reduced from 40 ns to 30 ns. These problems must be solved if the 256K*4 VRAMs are used to implement the 2K*2K resolution parallel accessed frame buffer.

Consider the operation of the conventional parallel accessed buffer. The clock rate is up to 350 MHz (3 ns) as shown in Table 1, and the minimum serial clock cycle is up to 30 ns. FIG. 3-1 illustrates the memory arrangement. The VRAM is divided into 16 banks. Each bank contains one fourth of pixels in one scan line, and contains one fourth of scan lines in a frame. Take bank 0 as an example. The row number 0 contains screen X=0, 4, 8, . . . , 2044 in Y=0, and column number 0 contains Y=0, 4, 8, . . . , 2044 in X=0. The horizontal direction of a VRAM contains 512 locations. Combining the locations from bank 0 to bank 3, there are 2048 locations, equal to one screen scan line. The vertical direction of a VRAM also contains 512 locations. Combining the banks in the vertical direction, there are 2048 locations, equal to the screen scan line numbers in one frame.

FIG. 3-2 illustrates the relationship between the pixel on screen and the corresponding position in the memory bank. Here a 4*4 bloc area is randomly selected and the frame buffer can be accessed in parallel.

FIG. 3-3 illustrates the raster output sequence. In this memory arrangement, four screen scan lines must be transferred at the first one of four horizontal scan lines. For power saving consideration, the screen lines can be transferred one by one, and continuously transferred four times during the horizontal blanking period.

The circuit block diagram for a conventional architecture of a display sub-system is illustrated in FIG. 4. Because the pixel clock rate is down to 3 ns, and the data shift simultaneously in the VRAM, the serial port can only support four pixels in the same screen horizontal line. Because 3 ns/pixel * 4 pixels=12 ns which is less than 30 ns, the temporary buffer must be used to store excess pixels ready for display. The data in the temporary buffer are read rapidly to the digital to analog converter VDAC/RAMDAC and are displayed on the screen. If the temporary buffer possesses the capacity for four scan lines, the cost would be excessive, because such access speed would require high speed circuits such as the Emitter Counpled Logic (ECL). Such chips occupy more board space, consume more power and increases the layout complexity and the hardware design complexity. Besides, the performance would be adversely afftected, because excessive time is required to update the temporary buffer for screen refresh.

SUMMARY OF THE INVENTION

The object of this invention is to use the high density video RAM for graphics display. Another object of this invention is to achieve high resolution graphics display consistent with minimum cost. Still another object of this invention is to retain the ability of parallel accessing the frame buffer. A further object of this invention is to improve the reliability of a graphics display system.

These objects are achieved in this invention by changing the memory arrangement. Pixel multiplexing or interleaving is used to replace the high speed temporary buffer otherwise required. In pixel multiplexing, the pixels in different portions of a scan line are accessed in parallel during one time increment of a time division multiplexing cycle, interleaving the pixels on each scan line. Each of these scan lines is completed after several time division cycles. The pixel MUX is composed of simple logic, multiplexing the pixel data in the memory to the VDAC/RAMDAC. It is cheaper and easier to control than the temporary buffer. With the improved parallel accessed frame buffer, better performance (without updating delay) can be obtained, in comparison with conventional parallel access frame buffer.

BRIEF DESCRIPTION OF THE DRAWINGS

FIG. 2-1 shows a conventional 1280*1024 memory arrangement of a parallel accessed frame buffer.

FIG. 2-2 shows the relations between pixels on screen and the pixel data in memory bank of a conventional 1280*1024 pixel display.

FIG. 2-3 shows a conventional 1280*1024 raster output of a parallel accessed frame buffer.

FIG. 3-1 shows a conventional 2048*2048 memory arrangement of a parallel accessed frame buffer.

FIG. 3-2 shows the relationship between pixels on screen and the pixel data in the memory bank of a conventional 2048*2048 pixel display.

FIG. 3-3 shows a conventional 2048*2048 raster output of a parallel accessed frame buffer.

FIG. 6-1 shows an improved 2048*2048 memory arrangement of a parallel accessed frame buffer, based on this invention.

FIG. 6-2 shows the pixel assignment of momery bank O, based on this invention.

FIG. 6-3 shows the relations between pixels on screen and the pixel data in memory bank of a 2048*2048 pixel display, based on this invention.

FIG. 6-4 shows an improved 2048*2048 raster output of a parallel accessed frame buffer, based on this invention.

DETAILED DESCRIPTION OF THE PREFERRED EMBODIMENT

The basic feature of this invention is to change the memory arrangement of a conventional architecture of a display system. A pixel MUX is used to replace the temporary buffer (in FIG. 4) in a conventional display system.

Figure 5:
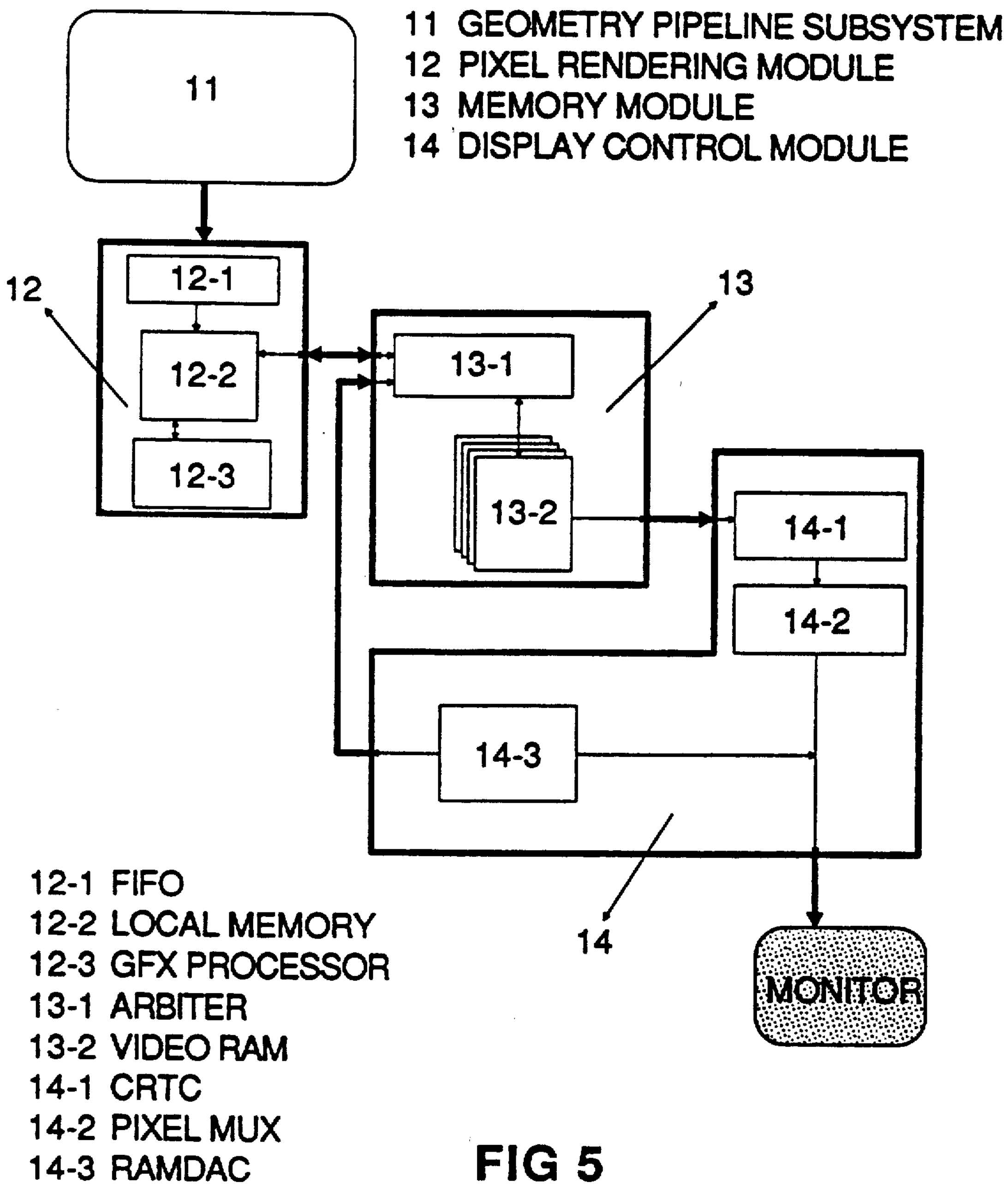
FIG. 5 shows the block diagram of different modules in a generalized computer graphics display system according to this invention.

The novel feature of this invention is shown in the block diagram in FIG. 5. This block diagram consists of a geometry pipeline subsystem module 11, and pixel rendering module 12, a memory module 13, and a display control module 14, corresponding to the modules 1,2,3 and 4 respectively in FIG. 1 for a generalized computer graphics display system.

The geometry pipeline subsystem 11 calculates the parameters of horizontal scan line generated by the output primitive in X direction, such as the scan line start point, end point, or the type of scan conversion, packs these parameters in command format, and broadcasts the command to all of the pixel rendering module 12. The pixel rendering module 12 is typically composed of FIFO, graphics processor, and the processor's local memory. The FIFO is used to receive the broadcast command from the geometry pipeline subsystem 11. The graphic processor interprets the command, calculates the pixel data value, and generates the memory cycle for the memory module 13. The scan conversion from screen coordinate (X,Y) to VRAM row and column address can be also implemented in the graphics processor. The memory module 13 is typically composed of arbitration circuit (arbiter), 256K*4 VRAM and some glue logic. The arbiter is used to solve the problem that the pixel rendering module 12 and the display control module 14 simultaneously access the VRAM random port. The number of the VARM depends on the number of the pixel data. For example, if the addressable resolution is 2K*2K, if the pixel depth is eight bit planes per pixel, and if the 256K*4 VRAM is used, the number of the VRAM is equal to (2K*2K*8)/(256K*4)=32. The display control module 14 is composed of CRT controller, pixel MUX and DAC module. The pixel multiplexer is used to access in parallel the pixels in different portions of a scan line during one time increment of a time division multiplexing cycle. After the multiplexing cycle, the pixels are interleaved to display on the screen. The CRT controller is responsible for screen refresh in the memory module 13 and generated the synchronization signal for the monitor.

The present invention mainly considers the memory arrangement in the memory module 13. It contains arranging the VRAM to sixteen banks which influence the arrangement in rendering module 12, arranging the row and column of the VRAM to correspond with the screen coordinate (X,Y) to the VRAM row and column addresses. This arrangement influences the implementation in the rendering pixel module 12, influences the type and complexity of the pixel MUX, and also influences the screen refresh type in the display control module 14.

Figure 1:
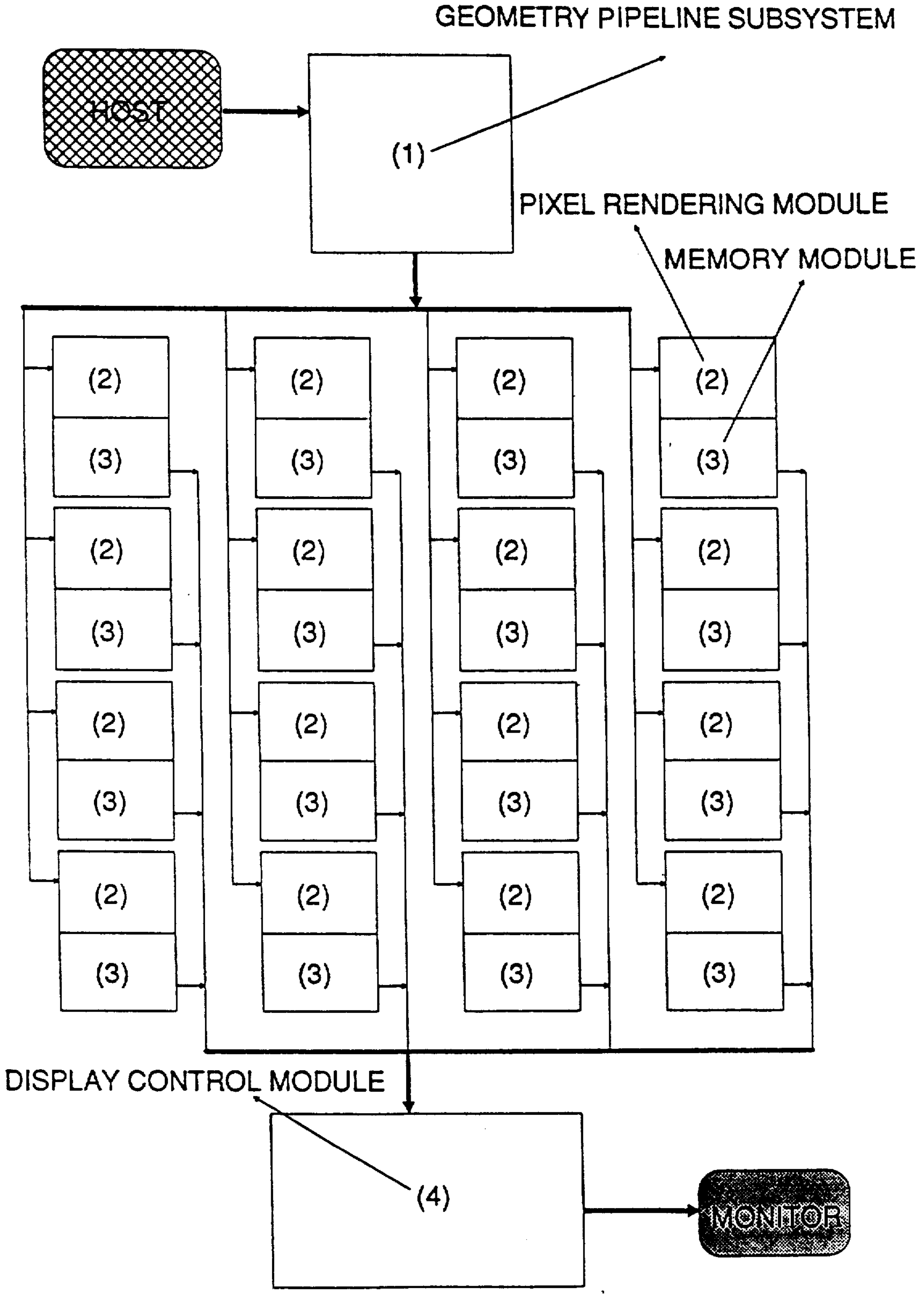
PRIOR ART FIG 1
FIG. 1 shows a generalized computer graphics display system.
Figures 1, 6:
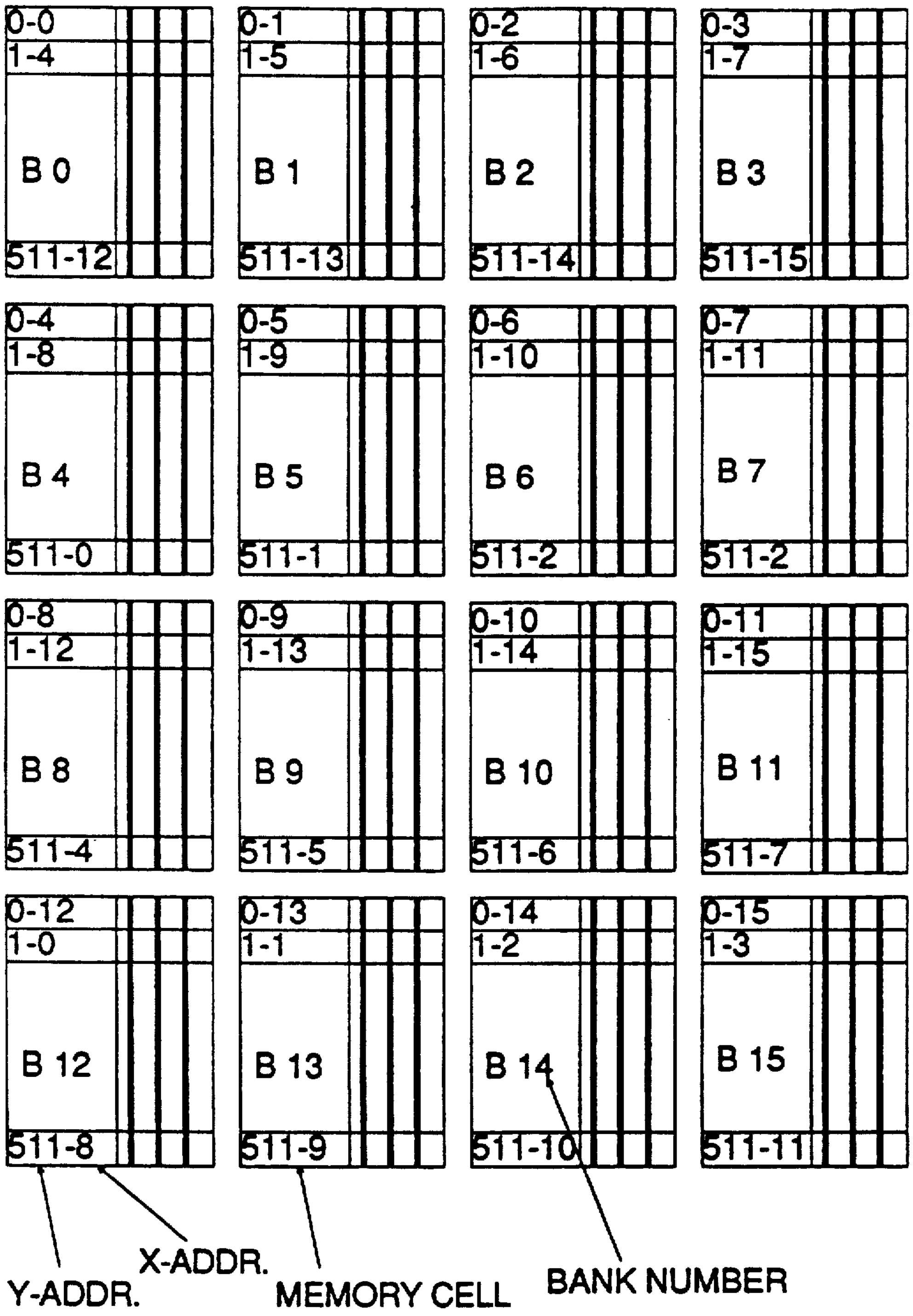
Figures 2, 6:
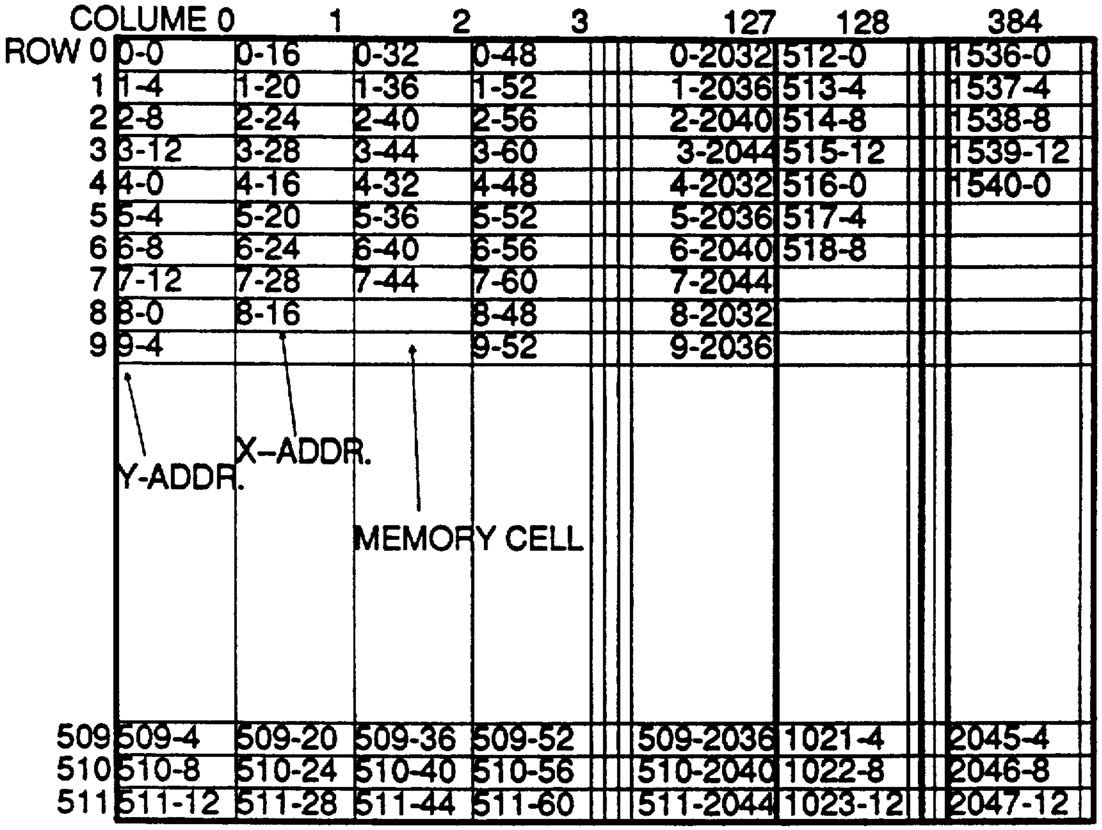
Figures 3, 6:
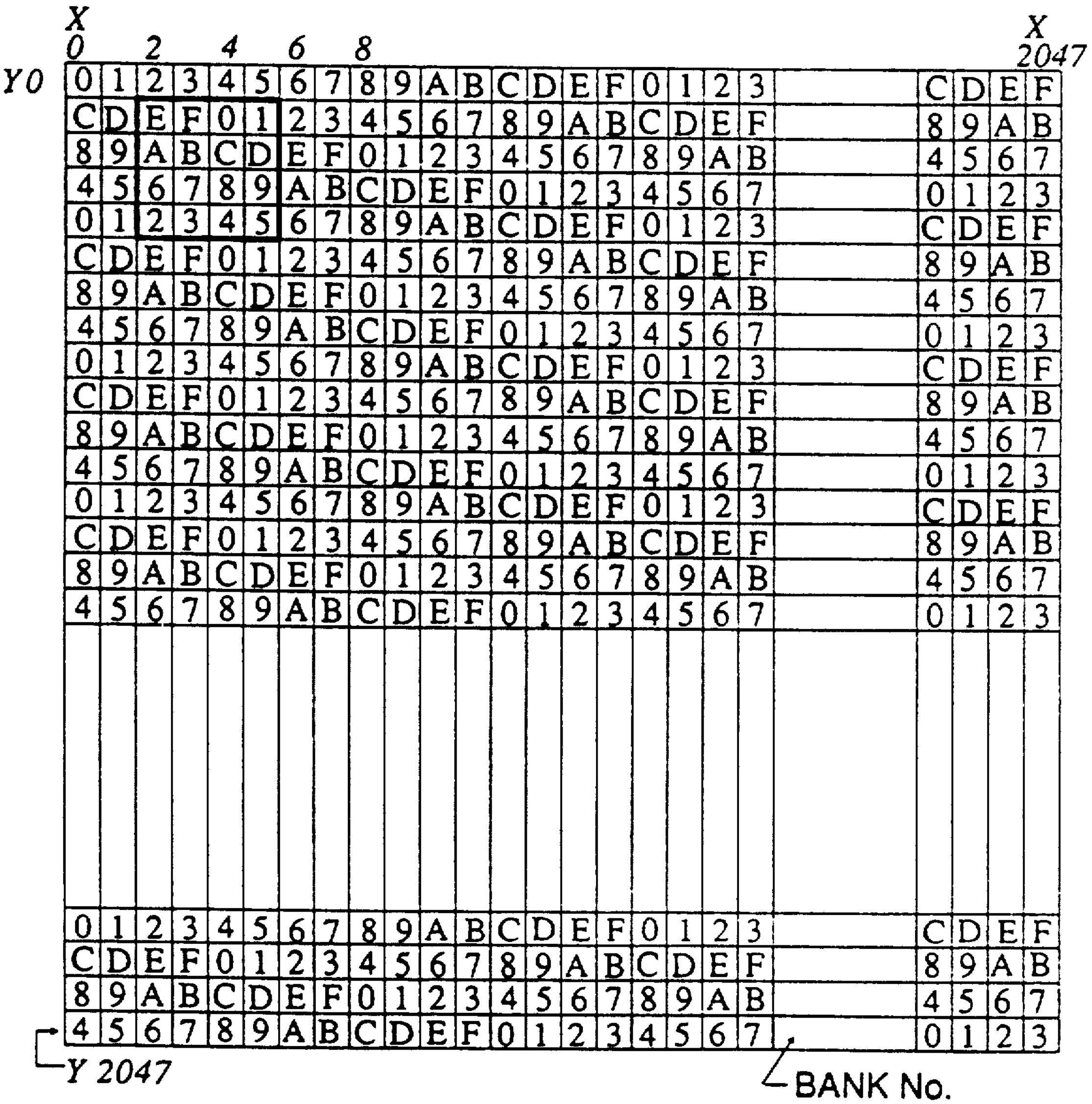
Figures 4, 6:
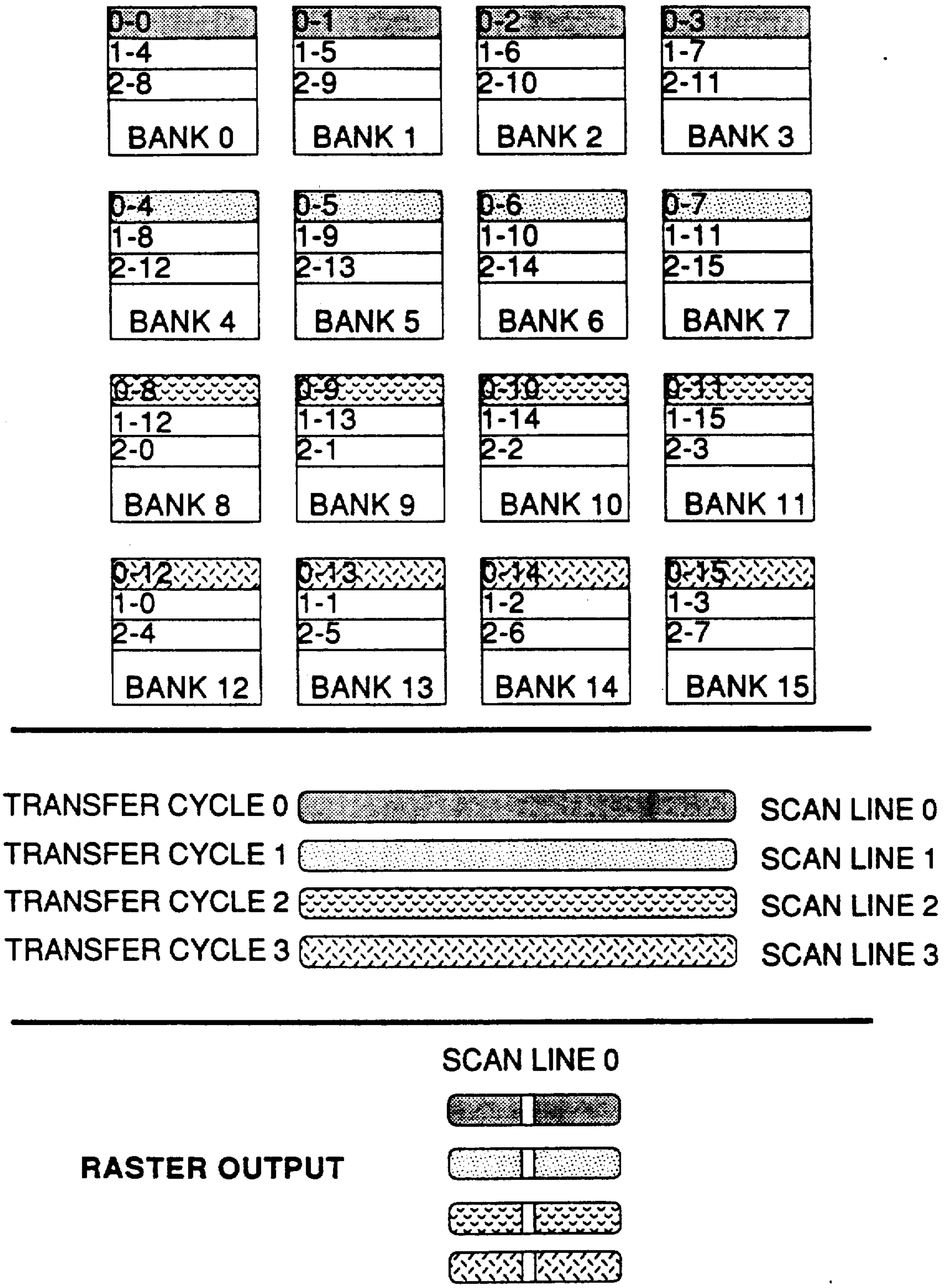

FIG. 6-1 illustrates an improved 2048*2048 memory arrangement of a parallel accessed frame buffer according to this invention. The addressable resolution is 2048*2048. The VRAM used is a 256K*4. VRAM. The pixel output rate can be down to 350 MHz (3ns/pixel) and the VRAM minimum serial clock cycle can be up to 30ns. The VRAM is divided into sixteen bank, and each of the sixteen banks shifts out one pixel data simultaneously. Hence, sixteen pixels is output at the same time. Since the VRAM is capable of handling a cycling rate for 16 banks equal to (1/30 ns)*16=533 MHz, which is greater than the pixel output rate of 350 MHz, the memory arrangement can readily be implemented by hardware circuit using VRAMs.

To simplify the circuit design in pixel output, the pixel shifted out at the same shift clock must occupy in each bank the same row and column address. For this consideration, the one scan line (2048 pixels) in screen only occupies 128 locations in each bank. Because there are 512 locations in the horizontal direction of a bank, one bank can be divided into four partitions.

That is to say, each bank contains the same 128 pixel locations in every horizontal scan line of the 2048 scan lines.

Figures 1, 2:
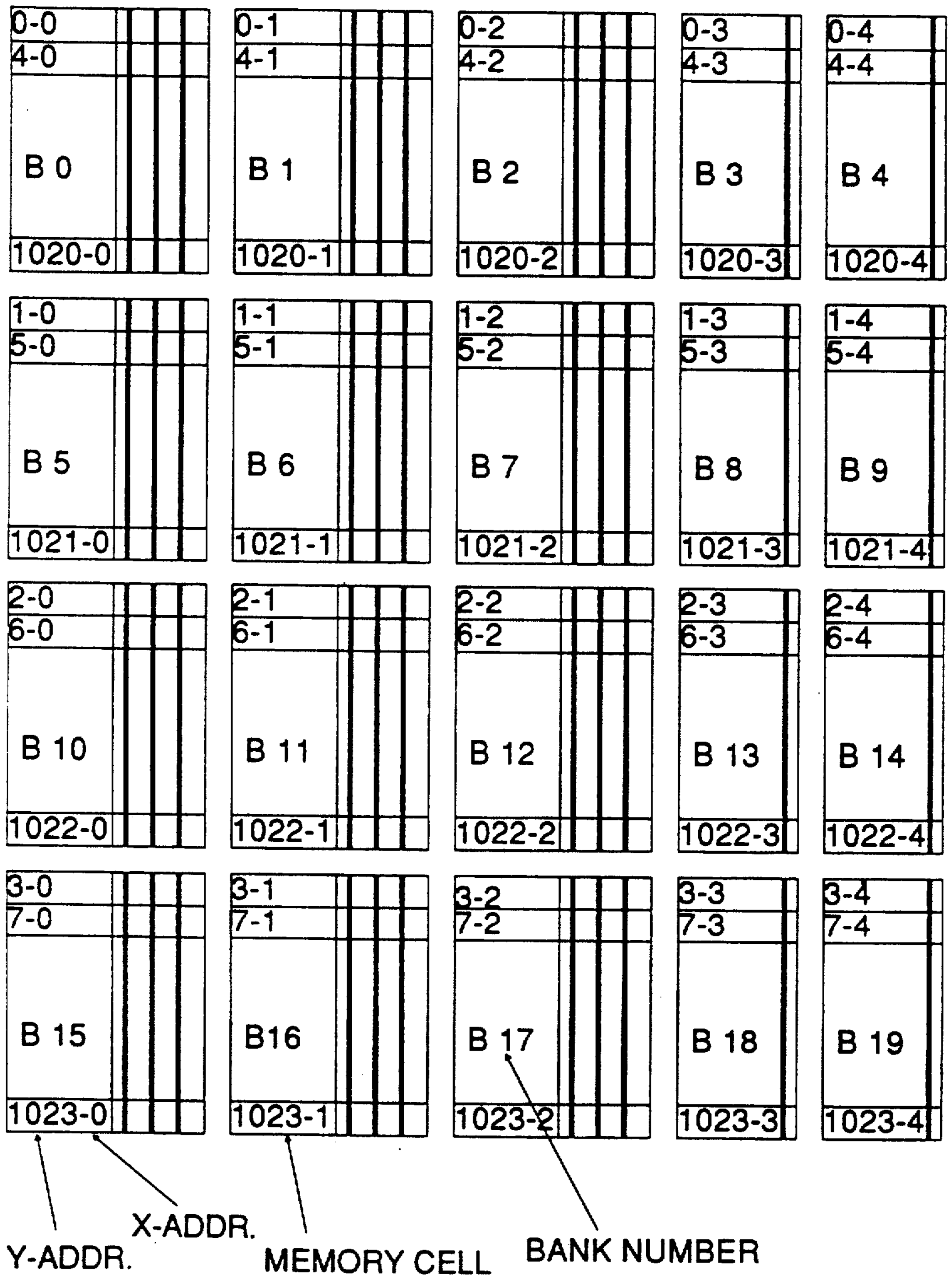
FIG 2-1 PRIOR ART
Figure 2:
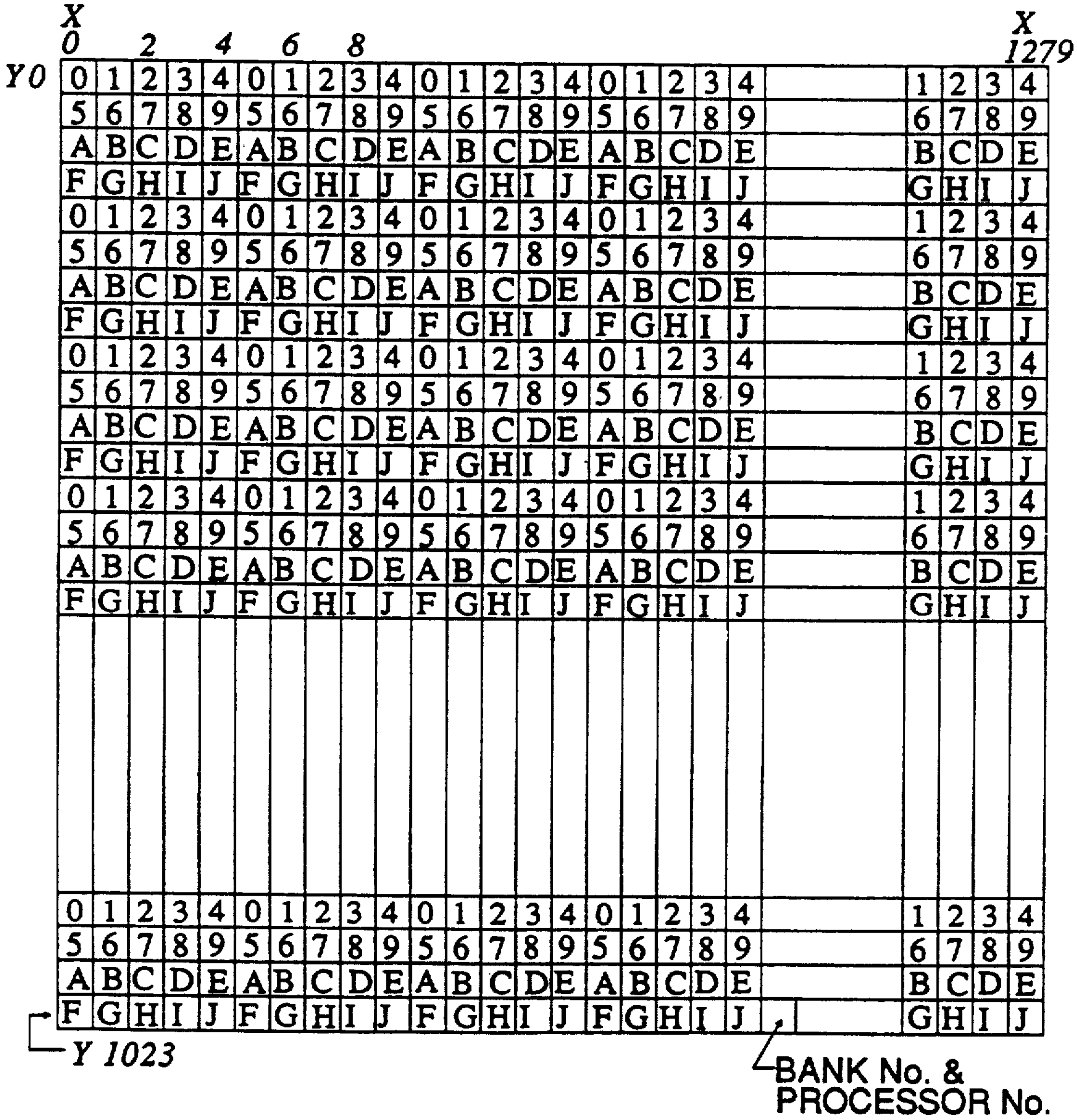
PRIOR ART FIG 2-2

FIG. 6-2 shows the pixel assignment of memory bank 0.

FIG. 6-1 and FIG. 6-2 is one of the solutions in our present invention. To summarize the above description, take for an example:

| | |
|---|---|
| Bank no.: | one member of sixteen VRAM banks |
| Row: | VRAM row address |
| Column: | VRAM column address |
| Partition: | one member of four partitions in VRAM row |
| (X,Y): | screen X address, and screen Y address |
| U MOD V: | remainder when U is divided by V |
| U DIV V: | quotient of U/V in integer number |

If Y MOD 4 = 0
  Bank no = X MOD 16
  Row = Y MOD 512
  Partition = Y DIV 512
  Column = X DIV 16 + partition *128;
If Y MOD 4 = 1
  Bank no = (X+12) MOD 16
  Row = Y MOD 512
  Partition = Y DIV 512
  Column = X DIV 16 + partition*128;
If Y MOD 4 = 2
  Bank no = (X+8) MOD 16
  Row = Y MOD 512
  Partition = Y DIV 512
  Column = X DIV 16 + partition*128;
If Y MOD 4 = 3
  Bank no = (X+4) MOD 16
  Row = Y MOD 512
  Partition = Y DIV 512
  Column = X DIV 16 + partition*128.
Summarized from the above equations:
  Bank no = (X+16−(4−(Y MOD 4))*4) MOD 16
  Row = Y MOD 512
  Partition = Y DIV 512
  Column = X DIV 16 + partition*128
The general equation is as follows:
  Bank no = (X + Bi) MOD 16
    Where i = Y MOD 4
    Bi: B0, B1, B2, B3 can be replaced by any permutation 16, 12, 8, 4
  Row has two types of flexibility
    1. row = Y MOD 512 or
    2. row = (Y DIV 4) MOD 512
  Partition = Pj
    If row = Y MOD 512 → j = Y DIV 512
    If row = (Y DIV 4) MOD 512 → j = Y MOD 4
    Pj: P0, P1, P2, P3 can be replaced by any permutation of 0, 1, 2, 3
    Column = X DIV 16 + partition*128

Figures 2, 3:
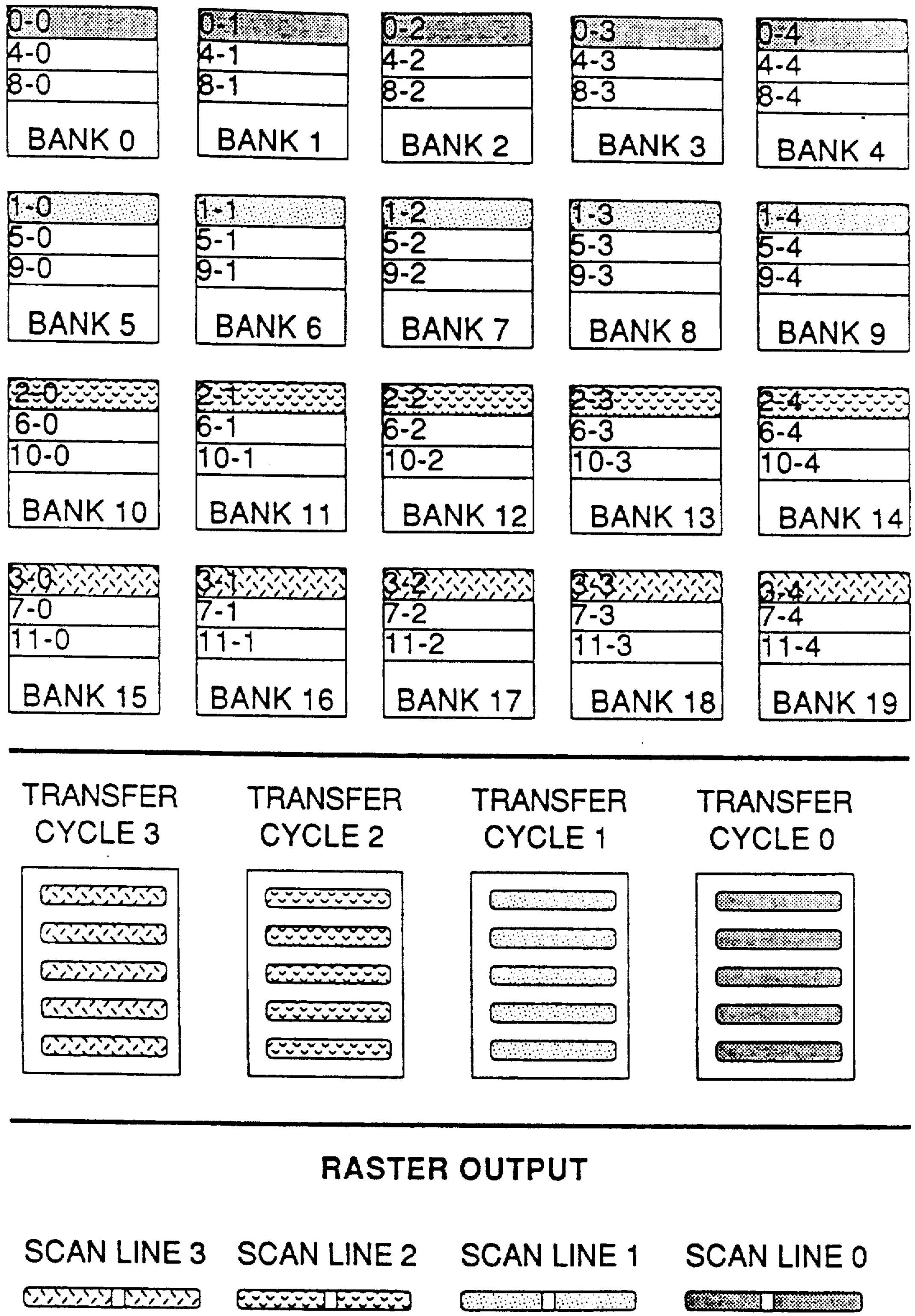
FIG 2-3 PRIOR ART
Figures 1, 3:
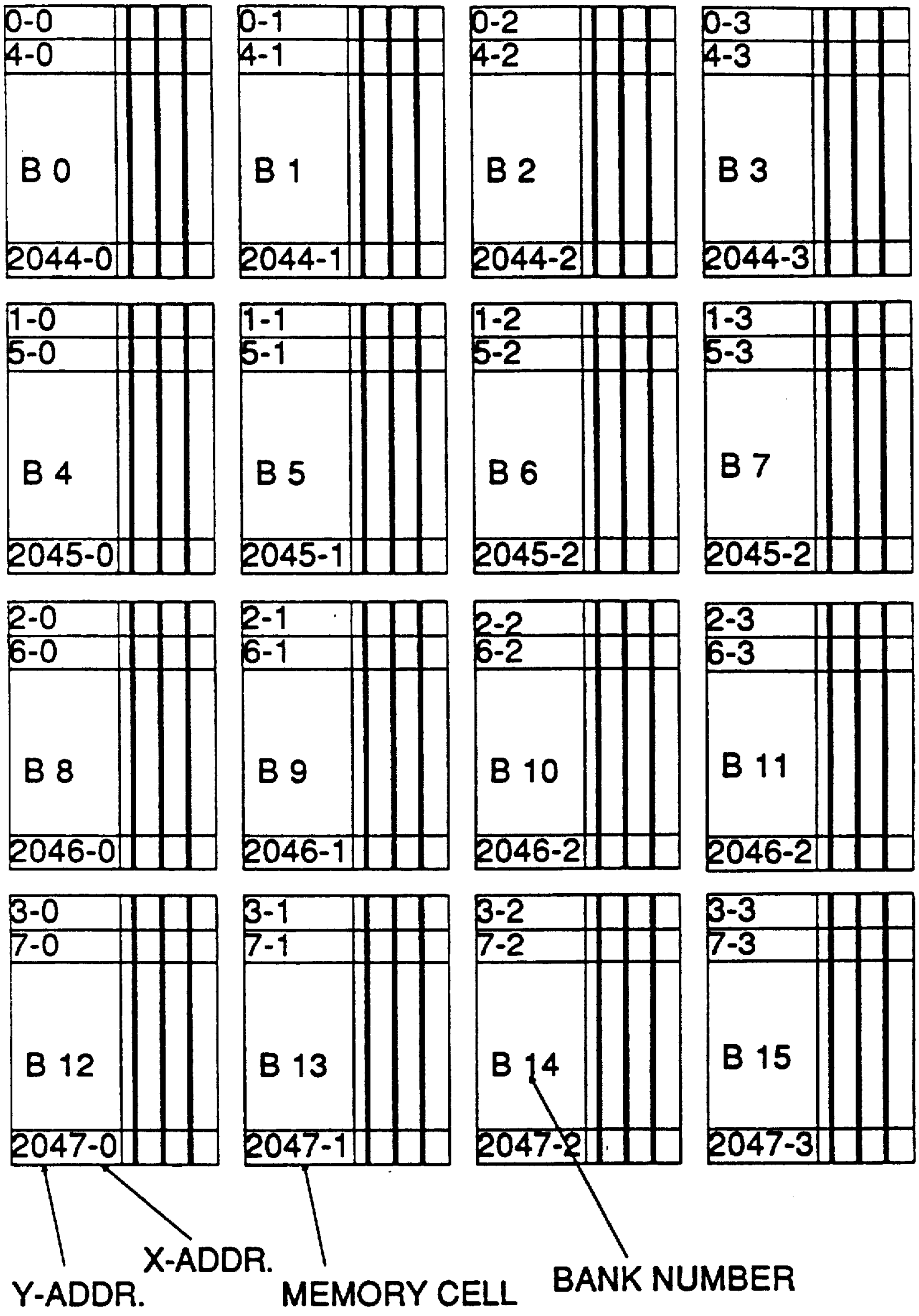
FIG 3-1 PRIOR ART
Figures 2, 3:
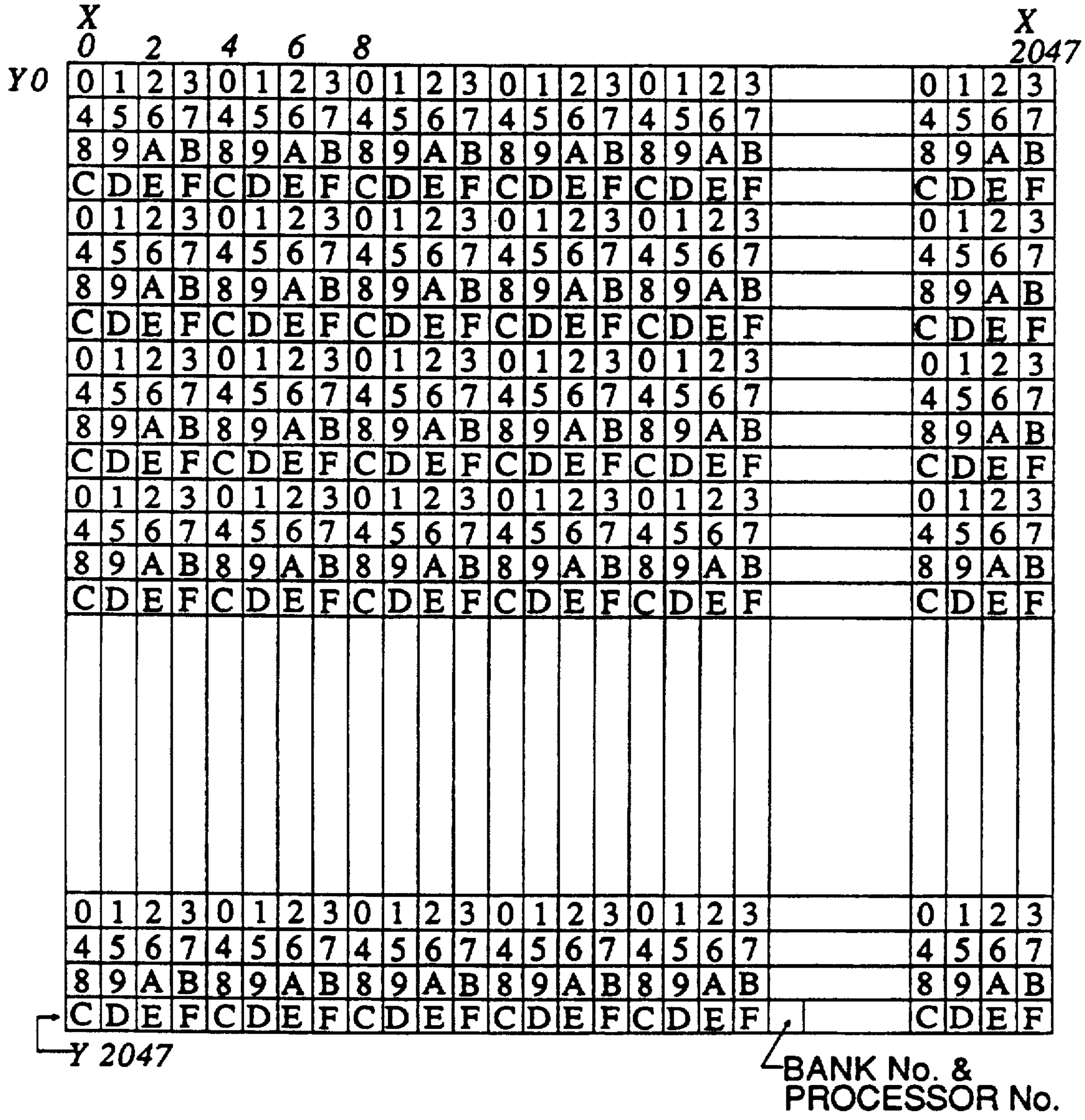
PRIOR ART FIG 3-2
Figure 3:
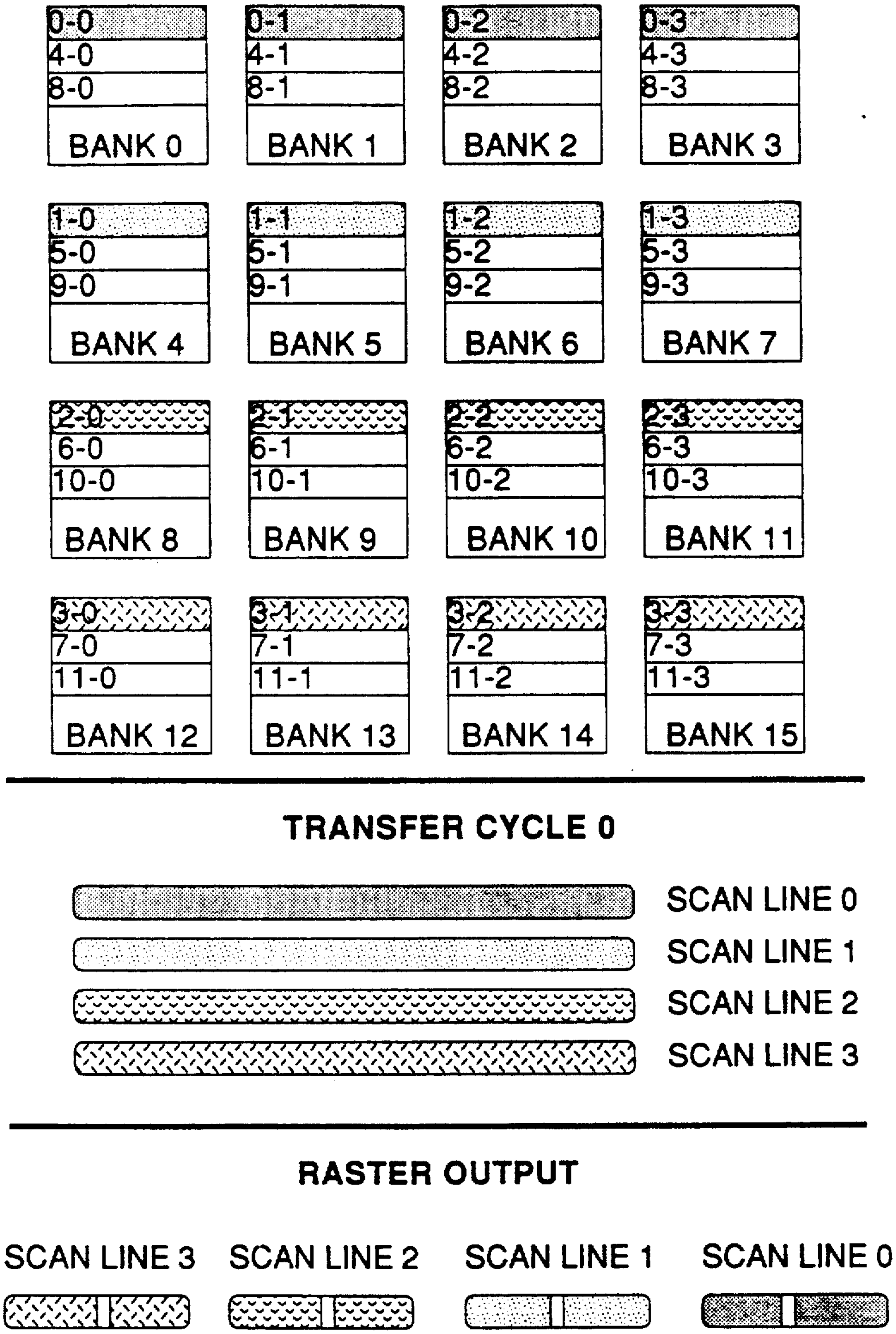
FIG 3-3 PRIOR ART

According to the above description, one can obtain one set of relations between pixel on screen and pixel in memory bank. FIG. 6-3 illustrates the relations. One can randomly select a 4*4 block area, and see that the block area contains all of the sixteen banks. Therefore, one can obtain the 4*4 parallel accessed frame buffer.

Figure 4:
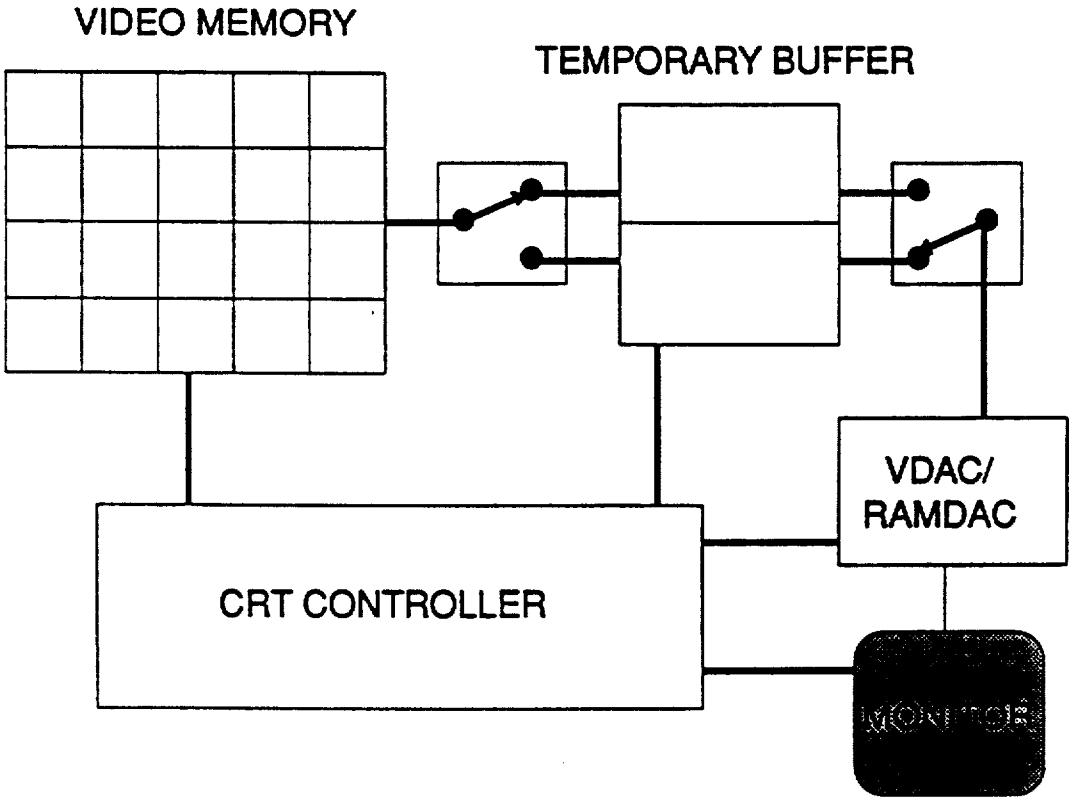
PRIOR ART FIG 4
FIG. 4 shows a conventional architecture of a display subsystem.

FIG. 6-4 shows an improved 2048*2048 raster output of a parallel accessed frame buffer. From this figure, one can show that present invention can be implemented by hardware point of view. In each horizontal blank period, one VRAM scan line in each bank is tranferred to the serial port. For power saving consideration, four banks can be transferred at one transfer cycle, so only four transfer cycles in one horizontal blank period are needed. Then one by one pixel data is shifted out from the VRAM serial port. The clock period is equal to sixteen pixel clock periods. Then these pixel data are sent to the pixel MUX, and, after converting to analog signal through VDAC or RAMDAC, displayed on the screen.

While the foregoing example applies to a 2K*2K resolution display using 256K*4 VRAMs, the arrangement scheme is not limited to this specific resolution and/or this type of VRAM. The arrangement scheme can be extended to other combinations of resolution and VRAM capacity.

The general arrangement scheme can be described in terms of the following definitions:

Set: Set of bank group.

Bank: VRAM chip group which is the minimum unit of parallel processing. All the banks can be processed simultaneously.

Partition: Partition in VRAM row.

X: Horizontal position in screen coordinate.

Y: Vertical position in screen coordinate.

A: Addressable horizontal resolution.

B: Addressable vertical resolution.

M: VRAM chip horizontal size.

N: VRAM chip vertical size.

E: Total number of banks in the horizontal direction.

F: Total number of banks in the vertical direction.

L: Pixel recursive number in the horizontal direction in the VRAM.

Q: Partition size.

U MOD V: remainder, when U is divided by V.

U DIV V: quotient of U/V in integer number.

[U]: the least integer that is greater than or equal to U.

The total number of sets S, the total number of banks K and the total number of partitions P are given by the following equations:

$$S=[(A*B)/(M*N*K)] \quad (1)$$

$$K=E*F \quad (2)$$

where E and F can be set to any positive number, and normally L is set to the same value as E or K. To avoid any increase in circuit complexity, the following condition must be met:

L*(1/pixel rate)>VRAM serial clock cycle time.

$$P=[M/Q] \quad (3)$$

where Q=[A/L].

The pixel location in the VRAM chips are given by the following equations:

Set number=(A*Y) DIV (M*N*K)

Row number=Y MOD N; or Row number=(Y DIV P) MOD N

Column number=(X DIV L)+(Pj*Q), where Pj is the partition number. Pj is set to a fixed value according to the following rule: Pj is set to any permutation of 0, 1, 2, . . . ((Y DIV N)−1), when the row number is equal to (Y MOD N); and Pj is set to any permutation of 0, 1, 2, . . . , ((Y MOD P)−1), when the row number is equal to ((Y DIV P) MOD N).

Bank number = (X + Ci) MOD K, where
i = Y MOD F

Ci can be replaced by any permutation of 0, E, E*2, E*3, . . . , E*(F−1).

It should be noted that while the arrangement of set, Row and Column is flexible, the Bank arrangement must be fixed, because it is the most efficient one adaptable to different types of resolution and VRAM capacity. This bank arrangement is the key feature of this invnetion.

What is claimed is:

1. A high resolution graphics display system comprising:

a high resolution monitor;

a display control module directly coupled to said high resolution monitor and comprising:

a cathode ray tube control (CRTC) circuit for generating control signals for said high resolution monitor, a digital-to-analog converter (DAC) circuit converting digital signals representing data points of images to be displayed on said high resolution monitor into analog signals, and a pixel multiplexer circuit for multiplexing said digital signals representing data points of images with a time division multiplexing scheme to form the proper data sequence for every scan line in said high resolution monitor and feeding the multiplexed digital signals to said DAC circuit, during one scan cycle, said pixel multiplexer activating simultaneously a portion of pixels on several scan lines with different column addresses, during subsequent scan cycle, said pixel multiplexer activating another portion of pixels of column addresses different from preceding scan cycle;

a parallel frame buffer module directly coupled to said display control module and comprising:

a set of parallel accessed video RAMs module for storing said digital signals representing data points of images to be displayed and supplying said digital signals to said pixel multiplexer, and an arbiter for arbitrating between said CRTC circuit and said parallel pixel rendering module whether said CRTC circuit is to refresh and transfer said digital signal representing data points of images stored in said set of parallel accessed video RAMS or a parallel pixel rendering module is to update said digital signals stored in said set of parallel accessed video RAMs;

said parallel pixel rendering module directly coupled to said arbiter and comprising:

a set of first-in-first-out serial memory (FIFOs), a set of parallel processing graphics processors for translating and processing in parallel broadcasted screen-space command streams such as any permutation of point, line, and polygaon drawing commands from said set of FIFOs to produce said digital signals into said set of parallel accessed video RAMs through said arbiter, a set of parallel local memory each of which is directly coupled to one of said set of parallel processing graphics processors for providing memory space for processing need of each of said set of parallel processing graphics processors and the geometry pipeleine module for receiving said broadcasted screen-space command streams from said geometry pipeline module and feeding said broadcasted screen-space command streams to each of said set of parallel processing graphics processors;

said geometry pipeline module directly coupled to said FIFOs for a pipeline transforming graphics data from object-space coordinates into eye-space coordinates, performing lighting, shading, clipping operations are appropriate in eye-space, projecting the resulting eye-space coordinates to screen-space coordinates, and broadcasting said screen-space command streams to said FIFOs in said parallel pixel rendering module;

said digital signals representing data points of images being produced via said geometry pipeline module and said parallel pixel rendering module, stored in said set of parallel accessed video RAMs, and displayed on said high resolution monitor through said time division multiplexing scheme in said display control module.

2. A high resolution graphics display system as described in claim 1, wherein arrangement of connections between each of said parallel processing graphics and each of said set of parallel accessed video RAMs is made to adapt to both parallel processing in said parallel pixel rendering module and said simple time-division pixel multiplexing scheme in said display control module.

3. A high resolution graphics display system as described in claim 2, wherein said arrangement implements a block area of said parallel accessed frame buffer with E total number of banks in the horizontal direction and F total number of banks in the vertical direction, and supports up to A addressable horizontal resolution and B addressable vertical resolution, said arrangement comprising a relationship among the horizontal position in screen coordinate X, vertical position in screen coordinate Y, pixel recursive number in horizontal direction in said VRAM L, partition size Q, a least integer [U] greater than or equal to a number U, remainder U MOD V of U/V, quotient U DIV V of U/V in integer number:

S=[(A*B)/M*N*K)]

K=E*F

L*(1/pixel rate)>VRAM serial clock cycle time

P=[M/Q], where Q=[A/L]

Set number=(A*Y) DIV (M*N*K)

Row number =Y MOD N, or (Y DIV P) MOD N

Column number=(X DIV L)+(Pj*Q), where Pj is a partition number, can be set to any permutation of 0, 1, 2 . . . ((Y DIV N)−1) when said row number is eual to Y MOD N, and can be set to to any permutation of 0, 1, 2 . . . , ((Y MOD P)−1) when said row number is equal to ((Y DIV P) MOD N)

Bank number = (*X* + *Ci*) MOD *K*, where
*i* = *Y* MOD *F*

Ci can be replaced by any permutation O, E, E*2, E*3 . . . E*(F−1).

4. A high resolution graphics display system as described in claim 2, wherein said arrangement implements a 4 by 4 block area of said parallel accessed frame buffer and supports up to 2K by 2K pixel display resolution, said arrangement comprising the following relationship between the X, Y coordinates of pixels on screen of said display and the bank number, row number, partition number, column number of said parallel accessed frame buffer;

said bank number = (X + Bi) MOD 16,
where i = Y MOD 4
Bi: B0, B1, B2, B3, which can be replaced by
any permutation of 16, 12, 8, 4;
said row number = Y MOD 512, or (Y DIV 4) MOD 512;
said partition number = Pj,
where j = Y DIV 512 if said row number = Y MOD 512,
j = +Y MOD 4), if said row number =
(Y DIV 4) MOD 512,
Pj: P0, P1, P2, P3 can be replaced by any
permutation of 0, 1, 2, 3;
said column number = X DIV 16 + partition number*128.

* * * * *